United States Patent [19]
Golden

[11] Patent Number: 5,887,038
[45] Date of Patent: Mar. 23, 1999

[54] ADAPTIVE ANTENNA ARRAY PROCESSING ARRANGEMENT USING A COMBINED COHERENT AND CONSTANT-MODULUS REFERENCE SIGNAL

[76] Inventor: Glenn David Golden, 868 Brook Rd., Boulder, Colo. 80302

[21] Appl. No.: 847,956

[22] Filed: Apr. 22, 1997

[51] Int. Cl.$^6$ .............................. H04B 7/08; H04L 1/06
[52] U.S. Cl. ...................... 375/347; 375/349; 455/138; 455/276.1; 455/278.1
[58] Field of Search ................... 375/267, 299, 375/346, 347, 349; 455/504, 506, 63, 65, 137, 138, 272, 273, 276.1, 278.1; 342/380, 368, 383

[56] References Cited

U.S. PATENT DOCUMENTS

| | | | |
|---|---|---|---|
| 4,797,950 | 1/1989 | Rilling | 455/276 |
| 5,481,570 | 1/1996 | Winters | 375/347 |
| 5,608,409 | 3/1997 | Rilling | 342/380 |

OTHER PUBLICATIONS

Winters, Jack H. et al. "The Impact of Antenna Diversity on the Capacity of Wireless Communication Systems", IEEE Transactions on Communications vol. 42, No. 2/3/4, Feb./Mar./Apr. 1994.

Winters, Jack H., "Signal Acquisition and Tracking with Adaptive Arrays in the Digital Mobile Radio System IS-54 with Flat Fading", IEEE Transactions on Vehicular Technology, vol. 42, No. 4, Nov. 1993.

*Primary Examiner*—Amanda T. Le

[57] ABSTRACT

An apparatus for performance improvement of a digital wireless receiver comprises a processing circuit for processing a plurality of received signals and providing a processed signal, wherein each of the plurality of received signals is weighted and combined to provide the processed signal; and a generation circuit for computing a composite reference signal for use in weight generation. The composite reference signal is computed as a weighted average of a coherent reference signal value and a constant-modulus reference signal value.

15 Claims, 2 Drawing Sheets ed ADAPTIVE ANTENNA ARRAY PROCESSING ARRANGEMENT USING A COMBINED COHERENT AND CONSTANT-MODULUS REFERENCE SIGNAL

CROSS REFERENCES TO RELATED APPLICATIONS

This application is related to, copending U.S. patent application Ser. No. 08/655,566, entitled "DC Offset Compensation Using Antenna Arrays" filed on May 29, 1997, copending U.S. patent application Ser. No. 08/756,293, entitled "Artificial Fading for Frequency Offset Mitigation" filed on Nov. 25, 1996, copending U.S. patent application Ser. No. 08/716,659, entitled "Joint Timing, Frequency And Weight Acquisition For an Adaptive Array" filed on Sep. 6, 1996, copending U.S. patent application Ser. No. 08/606,777, entitled "Introducing Processing Delay As A Multiple Of The Time Slot Duration" filed on Feb. 27, 1996 and copending U.S. patent application Ser. No. 08/695,492, entitled "Output Signal Modification For Soft Decision Decoding" filed on Aug. 12, 1996.

FIELD OF THE INVENTION

The present invention relates to the field of wireless communication and more particularly to digital wireless communications systems.

BACKGROUND OF THE INVENTION

In wireless communication systems, the use of antenna arrays at the base station has been shown to increase both range, through increased gain, and capacity, through interference suppression. With adaptive antenna arrays, the signals received by multiple antenna elements are weighted and combined to improve system performance, e.g., by maximizing the desired receive signal power and/or suppressing interference. The performance of an adaptive antenna array increases dramatically with the number of antennas. Referring to an article entitled, "The Impact of Antenna Diversity on the Capacity of Wireless Communication Systems," by J. H. Winters, R. D. Gitlin and J. Salz, in IEEE Trans. on Communications, April 1994, it is shown that using an M element antenna array with optimum combining of the received signals can eliminate M-1 interferers and achieve an M-N fold diversity gain against multipath fading, resulting in increased range.

Most base stations today, however, utilize only two receive antennas with suboptimum processing, e.g., selection diversity where the antenna having the larger signal power is selected for reception and processing. It is desirable to be able to modify existing base stations to accommodate larger arrays of antennas and/or improved received signal combining techniques. However, modifying existing equipment is difficult, time consuming, and costly, in particular since equipment currently in the field is from a variety of vendors.

One alternative is to utilize an appliqué, which is an outboard signal processing box, interposed between the current base antennas and the input to the base station, which adaptively weights and combines the received signals fed to the base station, optionally utilizing additional antennas. FIG. 1 shows a base station utilizing an applique. A key to the viability of utilizing the appliqué approach is that it should require little, if any, modification of the base station equipment. This constraint implies that the processing performed by the appliqué should appear to the existing base station as a high-quality received signal from a single antenna.

The signal processing functions performed by an adaptive array are typically designed to maximize the signal to interference-plus-noise ratio. One well known method for accomplishing this is by adjusting the adaptive array weights so as to minimize the mean squared error of the output signal with respect to a reference signal. Two common techniques for reference signal generation that are well known in the art are coherent reference and constant-modulus reference, the latter also being known in the art as the constant-module algorithm (CMA).

Coherent reference is based on either a prior knowledge of the transmitted symbol sequence, or, when the transmitted symbols are unknown, simple slicing of the received data samples. If the transmitted symbol, say $a_n$ is known a priori, then the coherent reference sample corresponding to that symbol is just $a_n$. If the transmitted symbol is not known a priori, then the coherent reference sample corresponding to the received sample $y_n$ is simply the constellation point which is closest to $y_n$.

The constant-modulus algorithm exploits the fact that many systems of interest utilize phase modulation, in which all the points in the constellation have constant modulus or magnitude, say R. The constant-modulus reference signal value corresponding to a received sample $y_n$ is chosen to be that point on a circle of radius R which is closest to $y_n$.

The primary advantages of utilizing coherent reference are its simplicity and the fact that it utilizes all of the information in the $y_n$, both the magnitude and phase. Coherent reference consequently permits rapid tracking in environments in which both amplitude and phase are time varying, such as the Rayleigh fading channel.

One disadvantage of coherent reference is that it requires either a priori knowledge, or reliable sliced estimates of the transmitted symbol sequence. If such estimates are in error, the reference signal is incorrect and the true mean squared error is not minimized. If estimation errors occur frequently, or in bursts, the adaptive array weights can diverge rapidly from the correct settings, resulting in severe performance degradation.

Another disadvantage of coherent reference is related to its embodiment of signal phase information. Because of this, coherent reference is susceptible to rapid phase fluctuations due to sources other than the channel itself, such as receiver carrier estimation errors. For many systems of interest, the carrier frequency offset may be comparable to or greater than the maximum rate of phase change due to channel fading. However, using coherent reference, the weights track phase rotation regardless of its source. Thus, the presence of large frequency offsets can degrade the array's ability to handle true channel fluctuations due to fading.

One advantage of using constant-modulus reference is that it is inherently "blind", that is, it requires no knowledge of the transmitted symbol sequence. It is also completely insensitive to phase fluctuations. However, because constant-modulus reference throws the away phase information from the $y_n$, its tracking performance is also fundamentally slower than coherent reference. Another significant disadvantage of constant-modulus reference is that since it exploits only the knowledge that the transmitted signal is constant modulus and ignores the actual symbol values, it is not capable of distinguishing between a desired constant-modulus signal and an interfering signal which is also constant modulus, e.g. another phase-modulated signal. Thus, an adaptive array employing constant-modulus reference can "lock on" to a constant modulus interfering signal and reject or cancel the desired signal.

3

In light of the above considerations there is therefore a need for combining coherent reference and constant modulus reference generation so as to take advantage of both techniques.

SUMMARY OF THE INVENTION

In accordance with the present invention, there is provided an apparatus for performance improvement of a digital wireless receiver. The apparatus comprises a processing circuit for processing a plurality of received signals and providing a processed signal, wherein each of the plurality of received signals is weighted and combined to provide the processed signal; and a generation circuit for computing a composite reference signal for use in weight generation. The composite reference signal is computed as a weighted average of a coherent reference signal value and a constant-modulus reference signal value.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited for use in TDMA mobile radio systems, such as North American Digital Mobile Radio Standard IS-136, and shall be described with respect to this application, the methods and apparatus disclosed here can be applied to other digital wireless communication systems. Other systems include but are not limited to the North American Mobile Radio Standard IS-54, the Groupe Speciale Mobile (GSM) based system, also known as Global System for Mobile Communications, which is a standard digital cellular phone service used in Europe and Japan, and the Digital European Cordless Telecommunications (DECT) based system, which is a pan-European digital cordless telephony interface specification. Although the present invention is suited for use with an appliqué and shall be described with respect to this application, the methods and apparatus disclosed here are equally well suited to an integrated application of adaptive arrays in a base station.

Figure 1:
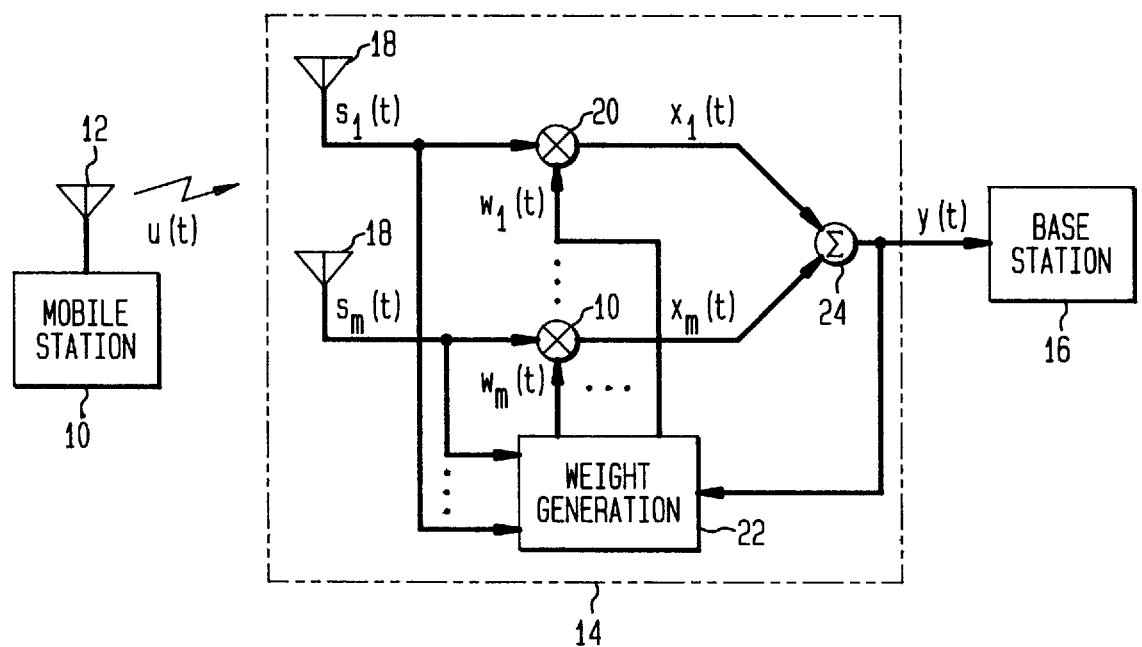
FIG. 1 is a block diagram of an adaptive array using multiple antennas.

Referring to FIG. 1 there is shown a block diagram of a type of signal processing used in a base station appliqué. A signal u(t) transmitted by a mobile station 10 through a mobile antenna 12 is received by a base station 16 from M antennas 18, with received signals $s_1(t)$ to $s_M(t)$ respectively. The received signals are weighted using multipliers 20 having weights $w_1(t)$ to $w_M(t)$ respectively, to generate corresponding weighted signals $x_1(t)$ to $x_M(t)$. The weighted signals $x_1(t)$ to $x_M(t)$ are then combined using summer 24 to generate an output signal y(t) which is then provided to the base station equipment. Weights $w_1(t)$ to $w_M(t)$ are generated by weight generation circuitry 22 based upon computations performed upon received signals $s_1(t)$ to $s_M(t)$ and output signal y(t). At the appliqué processor circuitry 14, received signals $s_1(t)$ to $s_M(t)$ are weighted and combined to improve signal quality at the output.

With the correct symbol timing and carrier frequency, the weights can be generated to combine the signals received from multiple antennas to increase gain and suppress interference, permitting operation even with noise and/or interference power that is greater than the signal power.

Figure 2:
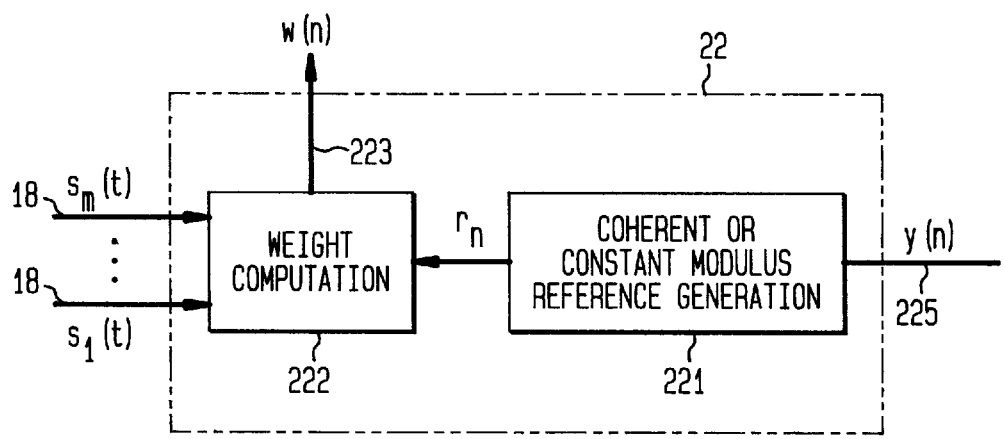
FIG. 2 is a block diagram of prior-art weight generation processing.

FIG. 2 depicts signal flow within prior-art weight processing circuitry 22 as appearing in FIG. 1. In what follows, ideal sampling at the symbol rate is assumed, and the discrete time index n is used to denote the n-th received symbol interval. In an adaptive array system where the weight computation is intended to optimally track the Rayleigh fading, the weight vector W(n), 223, corresponding to the n-th received symbol interval may be computed as the solution to the least-squares problem $$\min_{w(n)} \|A(n)w(n) - r(n)\|^2 \tag{1}$$

where $A(n)^{K \times M}$ is the channel sample matrix, $r(n)^{K \times 1}$ is the reference signal vector, K is the number of samples comprising the analysis window, and M is the number of weights. The ij-th entry of A is the (n−i+1)-th sample from the j-th antenna of the array. The reference signal vector r(n) comprises the past K reference signal values, $$r(n) = (r_n, r_{n-1}, \ldots, r_{n-k-1})^T \tag{2}$$

where $^T$ denotes transpose.

In a prior-art system, either coherent reference generation or constant-modulus reference generation is performed by reference generation circuitry 221. If coherent reference generation is employed, then the $r_i$ comprising r are obtained by simply quantizing ("slicing") the array output sample $y_n$, 225, that is $$r_n = Q(Y_n) \tag{3}$$

where $Q(y_n)$ denotes either the quantization operation, or, in situations where the transmitted symbol $a_n$ is known a priori at the receiver then $Q(Y_n) \equiv a_n$.

In a prior-art system utilizing constant modulus reference generation, assuming that the transmitted signal is phase modulated with all constellation points having modulus R, then $$r_n = \frac{Ry_n}{|y_n|}, \tag{4}$$

i.e., $r_n$ is the unique point on a circle of radius R which is closest to $Y_n$.

Figure 3:
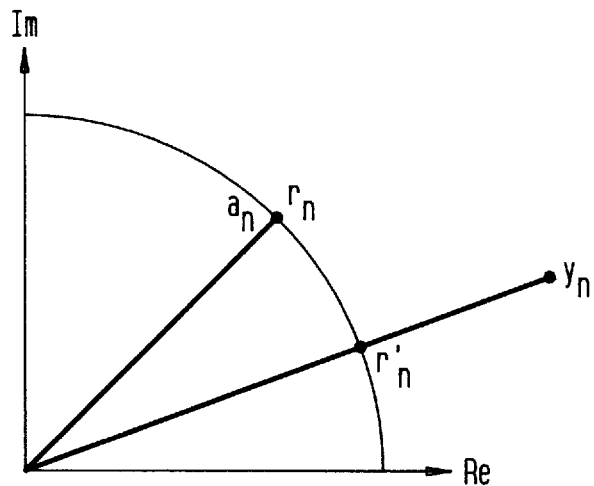
FIG. 3 is a graphical representation of received and reference signals.

Referring to FIG. 3 there is shown a graphical representation of the relationship of a received signal sample $y_n$ to coherent and constant-modulus reference signal samples $r_n$ and $r'_n$ respectively.

Figure 4:
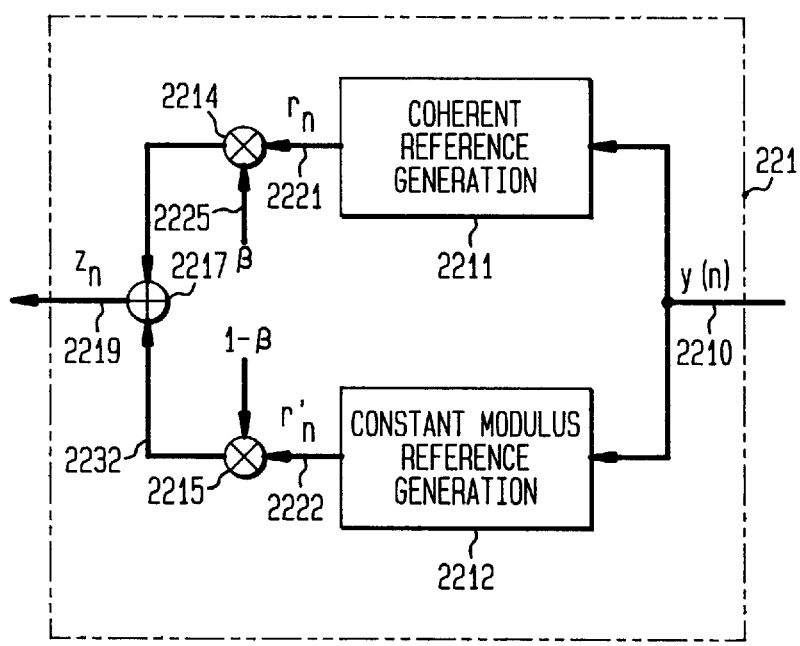
FIG. 4 is a block diagram of present invention reference generation.

Referring to FIG. 4, there is shown a block diagram of reference generation function 221 as performed using the present invention. In the present invention, reference signal generation block 221 combines coherent and constant-modulus reference generation in a way which enables the advantages of each to be exploited. The method consists of forming a composite reference signal $Z_n$,2219, which is a weighted average of coherent reference signal 2221 and constant-modulus reference signal 2222. A continuously adjustable weighting parameter β, 2225, determines the tradeoff between CMA-like and coherent-like properties of composite reference signal 2219. Rather than driving the weight generation algorithm with either coherent reference or constant-modulus reference, as in prior art, it is driven with the composite reference signal.

More specifically, composite reference signal $Z_n$, 2219, is computed as $$Z_n = RU(\beta r_n + (1-\beta) r'_n) \quad (5)$$

with $0 \leq \beta \leq 1$, and $U(\cdot)$ denotes normalization to unit magnitude. Thus, when $\beta=1$, composite reference signal $Z_n$ is purely coherent, and the weight generation operates exactly as a coherent system. When, $\beta=0$, composite reference signal 2219 is purely constant-modulus, and the system operates exactly as if it were a CMA system. For intermediate values of $\beta$, composite reference signal $Z_n$ has properties of both methods.

It is advantageous to adjust $\beta$, depending on the operating regime. During initial weight acquisition, when transmitted symbol values are known a priori at the receiver, $\beta$ can be chosen close to or equal to 1, in order to speed convergence and reject any constant-modulus interferers that may be present. Once weights have been acquired which substantially reject the interferers, $\beta$ can then be shifted towards zero, so as to increase the constant-modulus component of reference signal $Z_n$ so as to reduce sensitivity to phase rotation and decision errors. Since the parameter $\beta$ is continuous, the shifting from coherent to constant-modulus reference can be performed gradually.

Operation of the present invention can be described with reference to the components shown in FIG. 4. Multiplier 2214 multiplies coherent reference signal 2221 by $\beta$ to produce coherent reference component 2231, while multiplier 2215 multiplies constant-modulus reference signal 2222 by $(1-\beta)$ to produce constant-modulus reference component 2232. Component reference signals 2231 and 2232 are then additively combined by adder 2217 to produce composite reference signal $Z_n$, 2219, which then drives the weight computation process.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. An apparatus for performance improvement of a digital wireless receiver comprising:
    a processing circuit for processing a plurality of received signals and providing a processed signal, wherein a weight is applied to each of said plurality of received signals producing a plurality of weighted received signals and said plurality of weighted received signals are combined to provide said processed signal; and
    a generation circuit for computing a composite reference signal for use in weight generation;
    wherein said composite reference signal is continuously computed as a weighted average of a coherent reference signal value and a constant-modulus algorithm reference signal value.

2. The apparatus as recited in claim 1 wherein during initial weight acquisition said composite reference signal is substantially equivalent to said coherent reference signal value.

3. The apparatus as recited in claim 1 wherein after initial weight acquisition said composite reference signal is substantially equivalent to said constant-modulus reference signal value.

4. The apparatus as recited in claim 1 wherein said plurality of received signals comprise TDMA mobile radio signals.

5. The apparatus as recited in claim 4 wherein said TDMA mobile radio signals comprise IS-136 based mobile radio signals.

6. The apparatus as recited in claim 4 wherein said TDMA mobile radio signals comprise IS-54 based mobile radio signals.

7. The apparatus as recited in claim 1 wherein said processing circuit comprises a digital signal processor.

8. The apparatus as recited in claim 1 wherein said generation circuit comprises a digital signal processor.

9. A method for performance improvement of a digital wireless receiver comprising the steps of:
    processing a plurality of received signals;
    computing continuously a composite reference signal, for use in weight generation, as a weighted average of a coherent reference signal value and a constant-modulus algorithm reference signal value; and,
    weighting and combining each of said received signals to provide a processed signal.

10. The method as recited in claim 9 wherein during initial weight acquisition said composite reference signal is substantially equivalent to said coherent reference signal value.

11. The method as recited in claim 9 wherein after initial weight acquisition said composite reference signal is substantially equivalent to said constant-modulus reference signal value.

12. The method as recited in claim 9 wherein said plurality of received signals comprise TDMA mobile radio signals.

13. The method as recited in claim 12 wherein said TDMA mobile radio signals comprise IS-136 based mobile radio signals.

14. The method is recited in claim 12 wherein said TDMA mobile radio signals comprise IS-54 based mobile radio signals.

15. The method as recited in claim 9 wherein the step of processing a plurality of received signals utilizes a digital signal processor.

* * * * *